(12) United States Patent
Nemoto et al.

(10) Patent No.: US 6,316,076 B1
(45) Date of Patent: **\*Nov. 13, 2001**

(54) OMNIDIRECTIONAL BELLOWS

(76) Inventors: Takeshi Nemoto; Teruko Nemoto, both of 4-32, Jyomyoji 1 - chome, Kamakura 248 (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/309,823

(22) Filed: May 11, 1999

(30) Foreign Application Priority Data

May 29, 1998 (JP) .................................................. 10-166413

(51) Int. Cl.$^7$ ...................................................... G12B 1/04
(52) U.S. Cl. ........................ 428/102; 428/36.91; 428/126; 29/454; 493/940
(58) Field of Search ................................ 428/36.91, 128, 428/126, 102; 493/940; 29/454

(56) References Cited

U.S. PATENT DOCUMENTS

| | | |
|---|---|---|
| 3,967,023 | 6/1976 | Lysek . |
| 5,316,819 | 5/1994 | Nemoto et al. ........................ 428/102 |
| 5,376,454 | * 12/1994 | Sugasawa et al. ..................... 428/122 |
| 5,413,831 | 5/1995 | Nemoto et al. ......................... 428/43 |
| 5,558,951 | 9/1996 | Nemoto et al. ........................ 428/102 |
| 5,853,855 | 12/1998 | Nemoto et al. ........................ 428/176 |

FOREIGN PATENT DOCUMENTS

| | | |
|---|---|---|
| 0758570 | 2/1997 | (EP) . |
| 448646 | 4/1968 | (FR) . |
| 986279 | 3/1965 | (GB) . |

* cited by examiner

Primary Examiner—Alexander S. Thomas

(57) ABSTRACT

Omnidirectional bellows for reciprocal displacement is provided which, by preventing disproportional stretching or sagging in the midsection of bellows from occurring under any circumstances of positional alteration or intensive vibrations, allows normal reciprocal displacement operation to be continued. The omnidirectional bellows comprises, in a combination of a guide-rail with the bellows formed of multiple concaved sheets of same size and same shape communicating each with other for covering flexibly longitudinally along with one side of the guide-rail, a contour along with each inner border of said multiple concaved sheets being formed to follow cross-sectional profile in a direction perpendicular to the longitudinal direction of the guide-rail, and at least said each inner border being surface treated with material having small slipping resistance and large friction strength.

6 Claims, 2 Drawing Sheets

OMNIDIRECTIONAL BELLOWS

BACKGROUND OF THE INVENTION

1. Field of the Invention

The present invention relates to a flexible cover, more specifically, to an omnidirectional bellows for shielding reciprocally displacing mechanisms, in order to protect such mechanisms from extrinsic factors such as for example dust, dirt, light, moisture, humidity, etc.

2. Description of the Prior Art

Conventional bellows used for reciprocally displacing mechanisms have been assembled into a size and shape to have uniform gap between inner border of bellows ends and surface of a guide-rail so as to be allowed to smoothly repeat reciprocal displacement along with the guide-rail.

When the reciprocal displacement mechanisms having gap incorporated between the guide-rail and the bellows moves relatively long distance, the midsection of bellows is relaxed (sagged) in the direction of gravity while reciprocally displacing, so that there may occur cases in which the inner surface of bellows may contact with the guide-rail or the outer surface thereof in the direction of gravity may impinges against other devices to eventually cause disadvantages such as breakage.

In order to avoid sagging midsection of bellows, it is well known in the art that guide-plates in the form corresponding to the cross-sectional profile of the guide-rail used may be interposed every six (6) through seven (7) fold. The guide plates may be usually made of hard vinyl chloride plate die-cut by a press, in a form that the inner border approximates to the guide-rail surface with no gap, and aluminum frame is fit onto the outer border as reinforcement.

As long as the reciprocally displacing mechanism covered by the bellows of the prior art is used in lateral position and under circumstances of relatively fewer vibrations, such conventional structure may withstand well. However if the reciprocal displacement is used not only in horizontal but also in vertical, inclined, reversed, and altering direction, or is used under intensive vibrations, for example in case of aircrafts or express trains, the guide plate will act as weight to strain the bellows in gravity direction to cause disproportional stretching, or the midsection between the guide plates attached every six through seven fold may sag in gravity direction to cause impingement against other devices surrounding the bellows, difficulty in smooth stretching, or breakage.

BRIEF SUMMARY AND OBJECTS OF THE INVENTION

The primary object of the present invention is to provide an omnidirectional bellows which, by preventing disproportional stretching or sagging in the midsection of bellows from occurring under any circumstances of positional alteration or intensive vibrations, allows normal reciprocal displacement operation to be continued.

To achieve the above mentioned object, the omnidirectional bellows for reciprocal displacement according to the present invention comprises:

in a combination of a guide-rail with the bellows formed of multiple concaved sheets of same size and same shape communicating each with other for covering flexibly longitudinally along with one side of the guide-rail, a contour along with each inner border of said multiple concaved sheets being formed to follow cross-sectional profile in a direction perpendicular to the longitudinal direction of the guide-rail, and at least said each inner border being surface treated with material having small slipping resistance and large friction strength.

BRIEF DESCRIPTION OF THE DRAWINGS

The following description of a preferred embodiment of the present invention may be best understood by reading carefully with reference to the accompanying drawings, in which.

THE BEST MODE FOR CARRYING OUT THE INVENTION

It is preferable to use such material as Teflon as surface treatment.

Such arrangement as mentioned above may be provided on the midsection where sag is likely to be occurred in a bellows formed with multiple concaved sheets and may be omitted on both ends where sag may not be happened.

The process applicable to the omnidirectional bellows for reciprocal displacement according to the present invention comprises, seaming or melting process for interconnection of each adjacent multiple concaved sheets with others, and plying process of a single large material sheet for forming neighboring multiple concaved sheets.

EMBODIMENT

Figure 1:
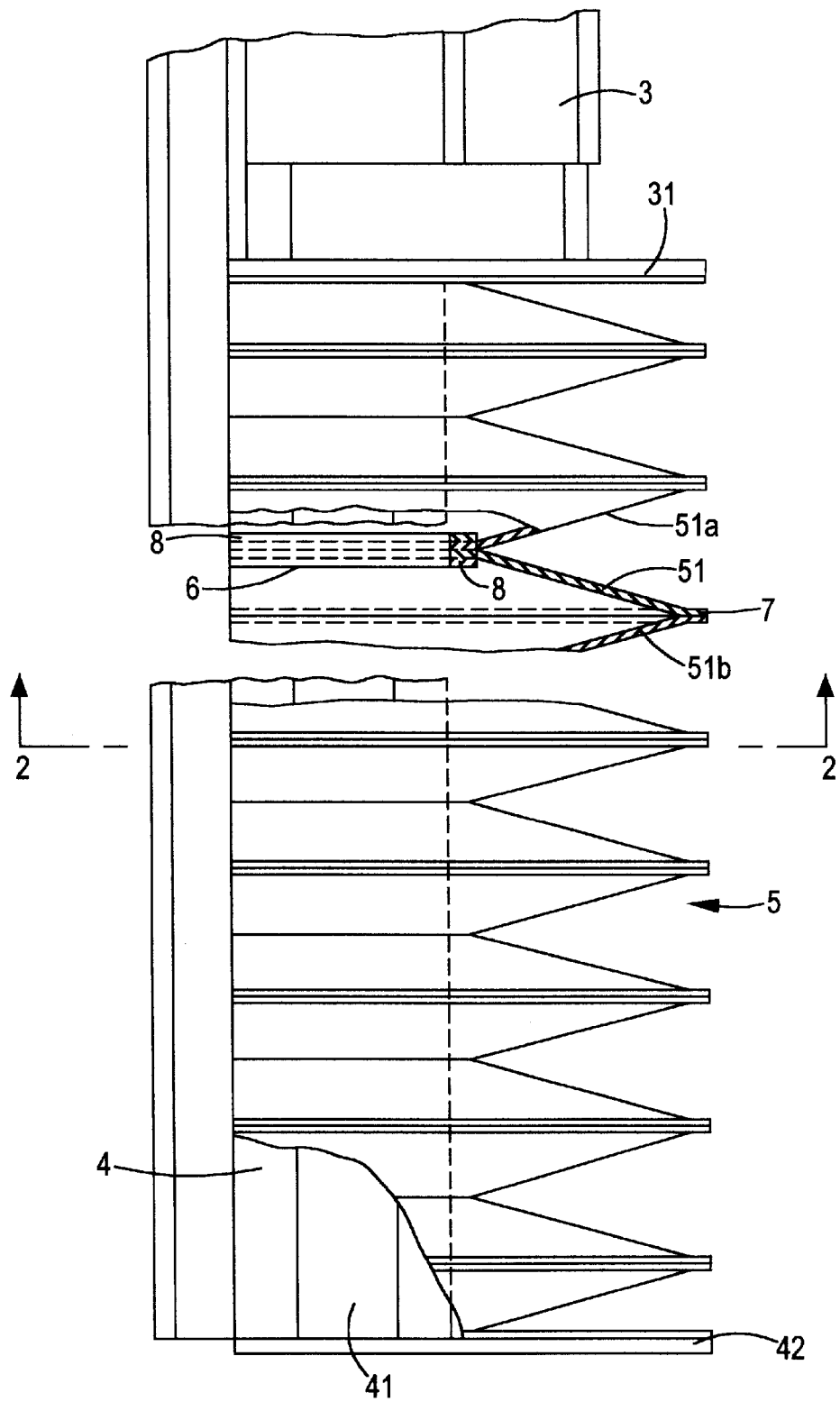
FIG. 1 is a partly sectional fragmentary schematic view illustrating a seamed omnidirectional bellows for reciprocal displacement in accordance with the present invention.
Figure 2:
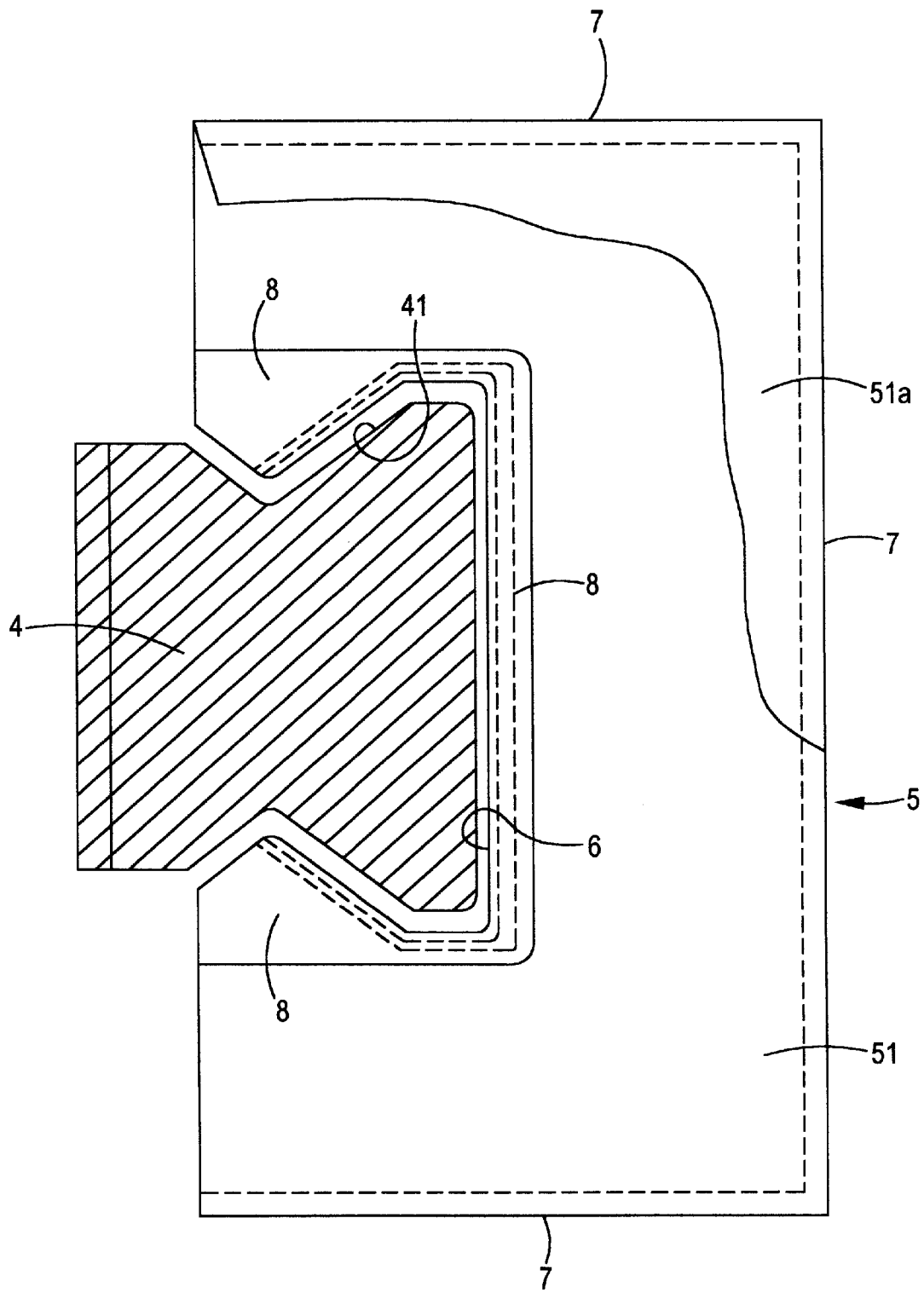
FIG. 2 is a transverse cross-sectional view taken along with line 2—2 of FIG. 1.

Now reference is made to FIG. 1, which shows a partly sectional fragmentary schematic view of an omnidirectional bellows for reciprocal displacement according to the present invention, wherein a bellows is illustrated which is formed by suturing process. FIG. 2 shows a transverse cross-sectional view taken along line 2—2 of FIG. 1. In these drawings, when a reciprocal displacing device 3 reciprocally displaces along with a rail of a guide-rail 4, the most part of the guide-rail 4 is covered while the device 3 is extending, and a guide surface 41 of the guide-rail 4 is exposed while the device 3 is shrinking. As is well known in the art, a bellows 5 is interposed between a movable attachment plate 31 mounted at a tip of the reciprocal displacing device 3 and a fixed attachment plate 42 mounted at a tip of the guide-rail 4 in order to prevent the guide surface 41 of the guide-rail 4 from being exposed to protect against a variety of extrinsic factors.

It is also well known in the prior art that multiple concaved sheets of the same size and same shape 51, 51a, 51b, . . . and so on, are concatenated to form the bellows 5, in a manner that the concaved sheet 51 is sutured to an inner border 6 of another concaved sheet 51a adjacent in one side thereon, while it is sutured to an outer border 7 of another concaved sheet 51b adjacent in other side thereon such that a series of bellows 5 is formed by concatenating by suturing alternately inward and outward.

According to the present invention, any contours along with each inner border 6 of multiple concaved sheets 51, 51a, 51b, . . . and so on, which forming the bellows 5 (see FIG. 2), are, in the combination as described above of the bellows 5 and the guide-rail 4, shaped so as to conform to the cross-section perpendicular to the longitudinal direction of the guide-rail 4 (shown by hatching pattern in FIG. 2). This accordingly results in no gap between them, providing solely the degree of freedom of sliding displacement therebetween.

Further, at least said inner borders 6 are surface treated with sheet of material that has small slip resistance and large friction strength, such as, for example, a Teflon sheet 8. Similarly, the above described function may also be achieved by surface treatment of whole concaved sheets 51, 51*a*, 51*b*, . . . , rather than the inner borders 6.

Arrangement of the concaved sheets 51, 51*a*, 51*b*, . . . , by configuring the contour of inner borders 6 thereof to that of the profile of the guide-rail 4 and surface treating these inner borders 6 with material having small slip resistance and large friction strength may be preferably provided on all of concaved sheets forming the bellows 5. However, in practice of reciprocal displacement, such arrangement may be provided only on the midsection where the bellows is likely to sag, instead of being provided entirely, since those concaved sheets incorporated in the bellows 5 in the proximity of the movable attachment plate 31 and the fixed attachment plate 42 have no margin enough to cause bellows to be sagged.

Although not shown in the drawings, according to the present invention, the arrangement may be applied to bellows of the type in which concaved sheets 51, 51*a*, 51*b*, . . . , are bonding processed, or bellows of the type in which multiple concaved sheets are formed by folding one single sheet material.

EFFECT OF THE PRESENT INVENTION

As can be seen from above detailed description, according to the present invention, the bellows may be formed by configuring the contour of the inner borders 6 thereof to that of the profile of the guide-rail 4 and then by surface treating these inner borders 6 with material having small slip resistance and large friction strength. Accordingly, if the reciprocal displacement mechanism 3 is used not only in horizontal but also in vertical, inclined, reversed, and altering direction, or is used under intensive vibrations, for example in case of aircrafts or express trains, normal operation is allowed to be continued without the risk of disproportional stretching or sagging in the midsection of bellows, thus without the risk of occurrence of troubles by sliding operation in contact with other devices.

It is to be understood that the present invention is not to be limited to the details herein given but may be modified within the scope of the appended claims.

Although the present invention has been described in conjunction with several preferred embodiments thereof, it should be understood that these embodiments are disclosed by way of examples and the present invention is not to be limited thereto. It should be recognized that many changes and modifications may be made by those skilled in the art without departing from the true spirit and the scope of the present invention set forth in the appended claims.

What is claimed is:

1. An omnidirectional bellows for reciprocal displacement, comprising:

in a combination of a guide-rail with bellows formed of multiple concaved sheets of same size and same shape communicating with each other for covering flexibly longitudinally along one side of the guide-rail, a contour along with each inner border of said multiple concaved sheets being formed to follow cross-sectional profile in a direction perpendicular to the longitudinal direction of the guide-rail, at least said each inner border being surface treated with material having small slipping resistance and large friction strength, said bellows being shaped to generally hook onto the guide-rail, thereby generally preventing movement of the bellows other than movement which is along the longitudinal direction of the guide-rail, said inner border having a cross-sectional shape consisting of a longitudinal bottom wall, and two opposing side walls intersecting said longitudinal bottom wall, each of said opposing side walls consisting of three walls, a first wall, a second wall and a third wall, said first wall being a top wall and intersecting the second wall at an acute angle, said second wall being a middle wall and intersecting said third wall at an obtuse angle, said third wall being a bottom wall and intersecting said longitudinal bottom wall at a right angle, said cross-sectional shape of said inner border generally corresponding to a cross-sectional shape of said guide-rail.

2. An omnidirectional bellows according to claim 1, wherein Teflon is used as said surface treatment material.

3. An omnidirectional bellows according to claim 1, wherein the arrangement set forth in claim 1 is provided in the midsection within the bellows formed by said multiple concaved sheets where said bellows is likely to be sagged, and is not provided in the endsections thereof where said bellows is not likely to be sagged.

4. An omnidirectional bellows according to claim 1, wherein said bellows is formed by concatenating said multiple concaved sheets adjacent to one another by suturing process.

5. An omnidirectional bellows according to claim 1, wherein said bellows is formed by concatenating said multiple concaved sheets adjacent to one another by a bonding process.

6. An omnidirectional bellows according to claim 1, wherein said multiple concaved sheets are formed from one single sheet material by folding process.

* * * * *